United States Patent Office 3,513,408
Patented May 19, 1970

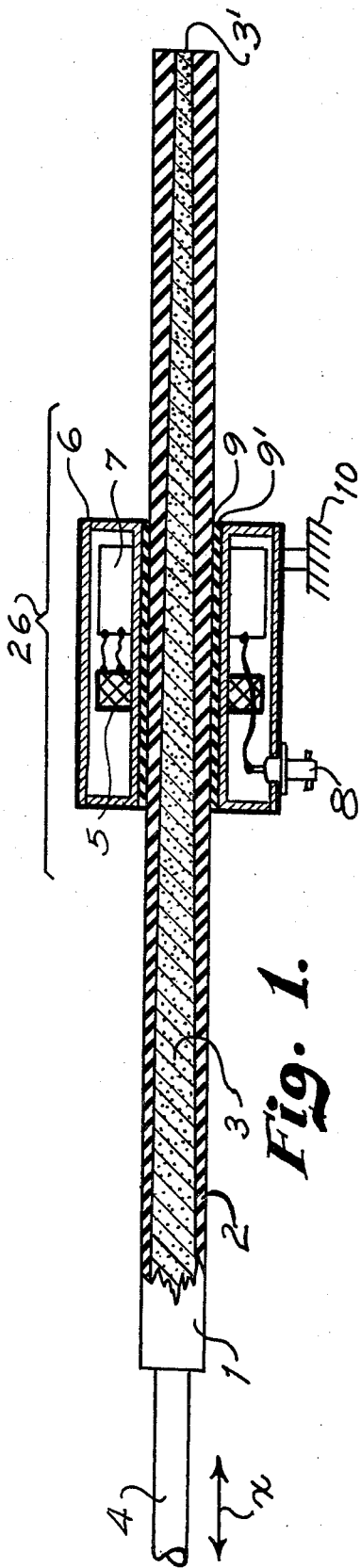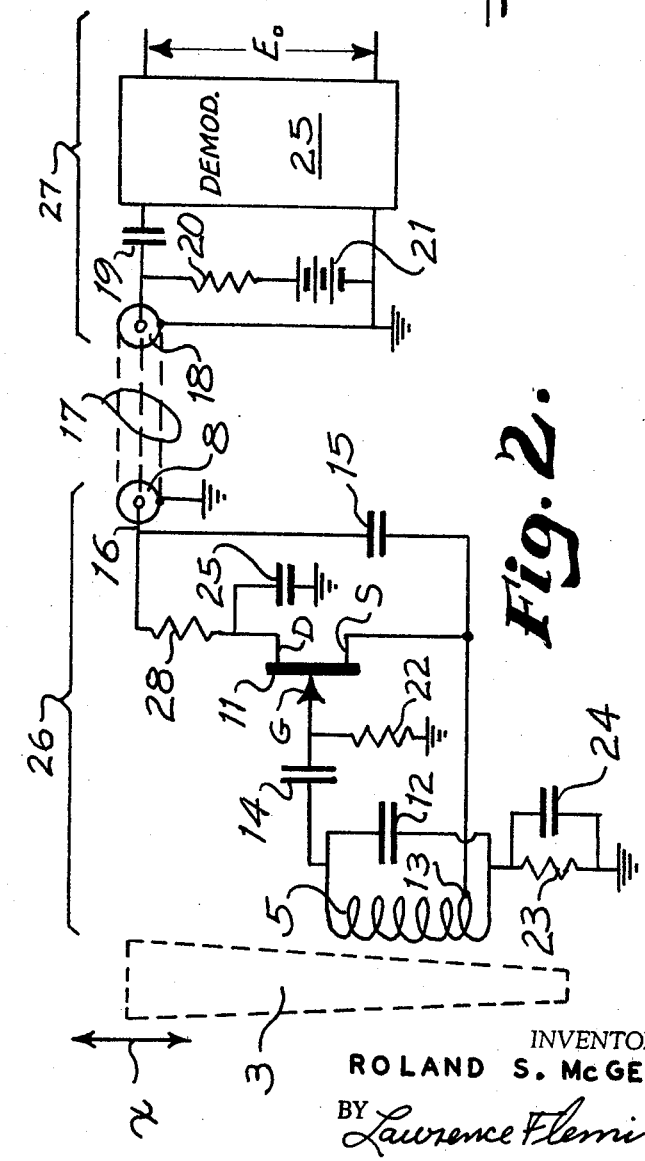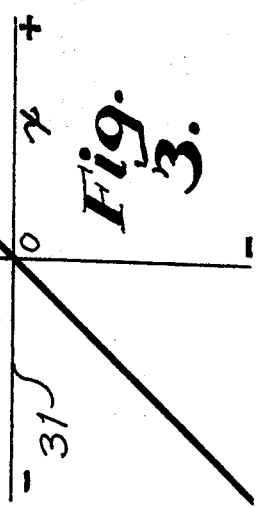
Fig. 1.
Fig. 2.
Fig. 3.
INVENTOR.
ROLAND S. McGEE
BY Lawrence Fleming
AGENT.

3,513,408
DISPLACEMENT TRANSDUCER OSCILLATOR WITH MOVABLE TAPERED MAGNETIC CORE
Roland S. McGee, San Pedro, Calif. (% Tri-Metrics, 2725 Chanticleer Ave., Santa Cruz, Calif. 95060)
Filed Aug. 1, 1968, Ser. No. 749,439
Int. Cl. G08c 21/00; H01f 21/06; H03b 5/12
U.S. Cl. 331—65                     8 Claims

ABSTRACT OF THE DISCLOSURE

A mechanoelectric transducer for application in severe mechanical and thermal environments employs an elongated tapered ferromagnetic core housed in a plunger which is surrounded by a relatively short coil. The mechanical input is the axial displacement of the plunger with respect to the coil. The inductance of the coil varies with the position of the plunger, and determines the frequency of an oscillator. Mathematical relations are given for the shape of the core vs. the frequency calibration. The signal delivered is of a nature particularly immune to mechanical deformation or whipping of the connecting cable, and to pyroelectric, electrolytic, and triboelectric effects, and is suitable for very long cables.

---

This invention relates to transducer systems for translating mechanical displacements into analogous electrical signals. In particular, the invention relates to transducers in which the inductance of a coil is varied by axial displacement of a ferromagnetic core which passes through the coil, and where the inductance of the coil determines the frequency or rate of an A-C signal, which may be then transmitted over a cable or other medium to recording, data-processing, or other apparatus, or to a servo system, to utilize the information contained in the original mechanical displacement.

The system of the invention particularly contemplates applications to problems where the environment involves high levels of shock and vibration, abnormal exposure to heat, humidity or foreign materials such as dust and hydraulic fluid, or long cable runs.

Such transducers are used in industrial and military instrumentation, to sense the mechanical displacements of components in testing of aircraft and ordnance items, for example. The electrical output signals of such transducers may be fed to recording or computing equipment, or into servo systems.

Prior art transducers of this class are restricted to relatively short stroke capacity, e.g., a small fraction of an inch or less, or alternatively require connecting cables of four or more conductors and the use of external bridge or other accessory circuitry, in which the inductance and resistance of the conductors in the cables affect the calibration of the system. See for example the book, "Mechanical Measurements by Electrical Methods" by Howard C. Roberts, The Instruments Publishing Co., Pittsburgh, 2nd edition, 1951, FIG. 34C, pp. 42–44, which shows a long-stroke inductance-type transducer employing a tapered ferromagnetic core as a plunger, the core being made of a bundle of iron wires. This reference proposes no specific type of circuit for sensing the inductance of such transducers, but pp. 58–79 of the book cited above suggest series impedance and bridge circuits for inductive transducers in general. All such circuits, as is known, include inherently the inductance and resistance of the connecting cable as part of the electrical impedance of the transducer itself, and so introduce errors or require individual calibration for different lengths of cable. The present invention is free from cable length effects, and has been used without special adjustment or calibration on cables over 2000 feet long.

The transducer system of the present invention is, moreover, capable of accurate functioning in environments of high mechanical vibration and shock. Such environments and applications involve substantial mechanical stresses and whipping in the connecting cable, which in prior art systems introduce spurious electrical signals and errors. In systems where the signal is small, e.g., of the order of millivolts (as in strain-gages), the motion of the cable in the earth's magnetic field introduces noise voltages in the conductors. In inductance and capacitance bridge systems, the stretching, bending, and whipping of the connecting cable introduce undesired variations in the inductance and capacitance of the cable. In high-impedance systems, motion of the cable conductors with respect to the insulation introduces triboelectric noise; and rapid changes in temperature, common in high-shock situations, produce pyroelectric potentials which contaminate the electrical signal.

In the present invention, the electrical output signal of the transducer system is at a relatively high level, e.g., several volts at low impedance, and in the form of a time function, e.g., a frequency. Since time is a phenomenon that has the special property of running at precisely the same rate at all points in space (so far as is known), it provides a uniquely stable reference quantity at both ends of a signal transmission medium. A voltage, current, or impedance will be affected, in its passage through a signal transmission medium (such as a cable) by variations in properties of the medium; or its signal-carrying properties may be degraded by noise induced by magnetic or electrolytic or triboelectric effects. But if the information is carried by a time function, such as a frequency or pulse rate, the cable or other medium cannot affect its accuracy, short of actual loss of the signal.

The invention therefore contemplates a mechanical displacement transducer for use under conditions of mechanical shock and vibration, and/or of relatively violent changes in temperature, which has means to translate the displacement into an electrical parameter, and thence into a time function for transmission as a quantitative signal to a remote point, over long cable runs if required.

In the drawing:
FIG. 1 is a simplified cross-sectional view of a form of the invention;
FIG. 2 is a schematic diagram of an oscillator and signal transmission circuit which is part of the invention;
FIG. 3 is a graph depicting a typical input-output characteristic of the invention.

In FIG. 1, a movable plunger 1 is arranged so that it can slide back and forth through an opening 9 in a housing 6. Opening or hole 9 may have a low-friction liner 9', of PTFE or the like. Contained in the housing 6 is a coil 5 which surrounds the opening 9, and electronic circuitry indicated in block form as 7. Power is supplied to the circuitry and the signal is transmitted to the outside via a 2-conductor cable, e.g., a coaxial cable, which may plug into a connector 8.

Attached to one end of the plunger 1 may be an actuating rod 4 of any appropriate type, which may be movable in the direction of arrow X. Housing 6 would normally be stationary, as indicated by the ground symbol 10.

The plunger 1 comprises a non-magnetic casing 2 having a constant exterior cross-section over its length, and an inner magnetic core 3 which is tapered. Its smaller end is shown at 3'. Considerations affecting the shape of the taper are as follows: I have shown by analysis that for the case of a long bar of magnetic material of relatively high permeability surrounded by a relatively short coil, the inductance of the coil is directly proportional to the average cross-sectional area of the core material within the coil boundaries. Thus, if the cross-section of the magnetic core should be constant, the coil could be located anywhere along the core's length without its inductance being changed (neglecting end effects). But if the core be tapered so that its cross-sectional area varied linearly along its length, then the inductance of the coil would vary linearly as a function of the axial position of the core.

In one embodiment of the invention in successful use, the dimensions of the magnetic core were as follows, the core being rectangular in cross-section:

| | Inches |
|---|---|
| Length | 42 |
| Large end | 0.170 x 0.170 |
| Small end | 0.170 x 0.050 | the ratio of cross-sectional areas at the ends being 3.4:1. The resulting frequency range of the oscillator signal, as a function of the range in inductance of the coil, was in this case approximately 294 to 306 kHz., the relation between frequency and core position being found highly linear with respect to the best line.

More exactly, $$f = \frac{1}{2\pi\sqrt{c}\ \sqrt{L_o + \Delta L}}$$

where $f$ is the frequency of oscillation, C the tank capacitance across the coil, $L_o$ the coil inductance with an air core, and L the additional inductance produced by the permeable core. Since $L = K_x$, where K is an experimental constant and $x$ the position of the core with respect to the coil, the relation between frequency $f$ and displacement $x$ is not theoretically exactly linear. It is found however in experimental measurements that with a linearly tapered core, as observed above, the $f$ vs. $x$ relation is quite linear, i.e., that the non-linearities in the equation (the inverse root function and the finite magnitude of $L_o$) tend to cancel each other. In an experimental transducer made to test such linearity, the core was ground to a precise taper, the sectional area varying linearly along the length, and the range of frequency of oscillation being 18 percent. The frequency, as measured by a digital counter, was found to maintain a linear relationship to the core displacement to within 0.1 percent over this range.

It is within the purview of the invention to taper the core according to any appropriate law, to obtain any desired relation between $f$ and $x$. Such systems may be used, for example, as function generators. The invention also contemplates the use of cores which may be curved as well as straight, e.g., toroidal, or bent around the rim of a wheel or disc, to sense mechanical displacements which are angular as well as linear.

The magnetic core 3 may be made of powdered ferromagnetic material, e.g., carbonyl iron or molybdenum permalloy powder, in a suitable binder, such as an epoxy resin. After curing, the core may be ground to shape. Any other suitable magnetic material may be used, such as a ferrite. The case 2 of the plunger 1 was constructed, in the example given above, of a special glass fiber cloth woven so that approximately 80 percent of its strength is in one direction, oriented so that the strong direction was axial. This material was impregnated with resin, and after the resin hardened, was ground and polished to provide a uniform cylindrical housing. The magnetic core, after grinding to shape, was then inserted into this housing, positioned radially with non-magnetic wedges, and potted into place with a suitable resin, to provide the complete plunger 1 of FIG. 1. Other known means of construction may be used.

Referring now to FIG. 2, the oscillator circuit and the signal utilization circuit are shown schematically, the oscillator circuit being shown in detail. In the preferred form of the oscillator shown in FIG. 2, an active element, suitably a field-effect transistor, is shown at 11. This element 11 is illustrated as connected in a Hartley oscillator circuit in combination with the above-mentioned coil 5 (also in FIG. 1), and a fixed tank capacitor 12. One end of the coil 5 is connected through a small capacitor 14 to the gate or control element of element 11 (labeled G in FIG. 2). A tap 13 on coil 5, near its lower end, is connected to the source (labeled S) of element 11, analogously to the cathode tape in an electron-tube oscillator. A capacitor 15 is connected between tap 13 and an output conductor 16, thence to a connector 8, wherefrom the signal, in the form of the oscillator frequency, may be transmitted via a cable 17 to a signal utilization apparatus indicated generally at 27. The transducer oscillator circuit itself is indicated generally at 26, and is, is earlier stated, mounted inside the housing 6, FIG. 1, in the block designated at 7.

Going back to the oscillator circuit 26, FIG. 2, the low end of coil 5 is connected to ground through a resistor 23 and a bypass capacitor 24, to provide suitable bias for active element 11, in the known manner.

It has been found that, at the high end of tank circuit 5, 12, it is practicable to employ a coupling capacitor 14 whose capacitance (e.g., 2 pf.) is small compared to the input capacitance of active element 11. Thus, variations in the input capacitance of elements 11 due to manufacturing tolerances, operating current, temperature, or age, will be made to have a greatly attenuated effect on the total capacitance appearing across the tank circuit 5, 12, and hence upon the output signal in the form of the frequency of oscillation. To establish the potential of control electrode G, a resistor 22 is provided which in the case illustrated is connected to ground. In the case where active element 11 is a field-effect transistor, resistor 22 may be made one or more orders of magnitude higher than the resonant impedance of the tank circuit 5, 12, which is approximately $L\omega Q$, where L is the inductance of coil 5, $\omega$ is $2\pi$ times the frequency and Q is the common figure of merit of an inductor, the ratio of stored to dissipated energy.

The final elements of interest in the circuit of FIG. 2, portion 26, are resistor 28 and capacitor 25. Resistor 28 is chosen so as to permit a tolerable, but not excessive, D-C voltage drop for the supply voltage to the output electrode (labeled D) of element 11, and at the same time present a satisfactorily high shunt impedance to the signal output circuit, to avoid loading it appreciably. The signal output circuit in this case is the portion of the tank coil 5 between its tap 13 and its lower end which in a typical case may have an impedance of a few hundred ohms or less. Resistor 28 may be replaced by a choke, but a resistor is satisfactory in many practical embodiments. Capacitor 25 is a bypass to provide a low signal-frequency impedance to ground, i.e., between the output electrode D of active element 11 and the low end of tank circuit 5, 12, as is known in Hartley and related oscillator circuits.

It will be seen that conductor 16 may carry both the D-C power supply voltage to electrode D of active element 11, and also the A-C oscillator signal which is transmitted out to the utilization circuit 27 via cable 17.

Utilization circuit 27 is shown partly in block form. The D-C power to oscillator circuitry 26 is supplied by a battery or other conventional form of supply 21 through an impedance, such as a choke or resistor to the cable 17, for example the center conductor of a coaxial cable through coaxial connectors 8 and 18. A capacitor 19 may be employed to block the D-C from the subsequent circuitry, but permit the A-C oscillator signal to pass through. This A-C signal may be sensed and/or processed by known means shown generally as a block 25, which senses the frequency and translates it into an analog D-C output, or into digital or other desired form indicated at E. One circuit successfully used is the kind known as a pulse-averaging discriminator. The output on this frequency-sensing or similar device 25 is indicated as $E_o$ in FIG. 2.

FIG. 3 is a graphical showing of the input-output relation measured on a practical embodiment of a system of the kind described. Using the 42-inch tapered magnetic core specified above, a curve 32 was obtained, relating output from a pulse-averaging discriminator or related device 25 (FIG. 2) to the original mechanical displacement imparted to the magnetic core 3. The output signal is measured along axis 30 as $E_o$, the mechanical input displacement along axis 31 as quantity $x$, and the transfer characteristic along 32, which, as described above, has been made linear within 0.1 percent over a range of oscillator frequency of 18 percent.

Tests of the invention for the effects of temperature, humidity, and variations in supply voltage, have shown superior reliability and stability.

The term "tapered" herein is meant to refer to the magnetic properties of the core, rather than solely to its physical dimensions. Thus, a core may have constant physical cross-section over its length or circumference, but may be tapered in its magnetic properties by means of a systematic variation in density or composition along its length.

I claim:

1. A displacement transducer system comprising
a tapered ferromagnetic core slidable with respect to a surrounding housing, a relatively short coil in said housing, said coil having an inductance that varies with the position of said core,
an oscillator circuit in said housing and connected to said coil as a frequency-determining element, and
means to couple the A-C output of said oscillator circuit to an external signal transmission path.

2. A transducer system as in claim 1 wherein
said oscillator circuit is of the Hartley type having a tap on said coil and employing a field-effect transistor as an active element,
an end terminal of said coil being connected to a control element of said transistor through a capacitance which is small compared to the internal capacitance of said transistor.

3. A transducer system as in claim 1 further comprising
a two-terminal connector mounted on said housing,
circuit elements to pass D-C power from a terminal of said connector to said oscillator, and circuit elements to couple A-C oscillator signal output power to the same terminal, whereby power supply voltage and signal output may be carried by the same two-conductor cable.

4. A transducer system as in claim 2, wherein an output element of said transistor is connected to said tap, a bypassed resistor is connected between another end terminal of said coil and ground, and a coupling capacitor is connected between said tap and and an output connector.

5. A transducer system as in claim 1, wherein said core is tapered linearly in area from end to end.

6. A transducer system as in claim 1, wherein said core is tapered in effective magnetic permeability in linear relation from end to end, and is connected to control the frequency of electrical oscillation generating means, said linear relation producing a precise relation between the mechanical position of said core and the frequency produced by said oscillation generating means.

7. A transducer system as in claim 1, wherein said core is composed of a finely divided ferromagnetic material in a relatively small percentage of a binder,
said core being machined to final shape after said binder has solidified.

8. A transducer system as in claim 7, wherein said core is encased in a non-magnetic plunger-like case which has a constant cross-section throughout its length.

References Cited

UNITED STATES PATENTS

| | | | |
|---|---|---|---|
| 3,197,756 | 7/1965 | Maynard | 331—65 X |
| 3,436,681 | 4/1969 | Hart | 331—117 |

ROY LAKE, Primary Examiner

S. H. GRIMM, Assistant Examiner

U.S. Cl. X.R.

331—117, 181; 336—130